W. H. & C. L. REID.
SELF DUMPING BARGE.
APPLICATION FILED AUG. 26, 1913.

1,117,906.

Patented Nov. 17, 1914.
8 SHEETS—SHEET 1.

Fig. 1.

Witnesses
J. L. Wright
[signature]

Inventors
William H. Reid
Charles L. Reid
By Victor J. Evans
Attorney

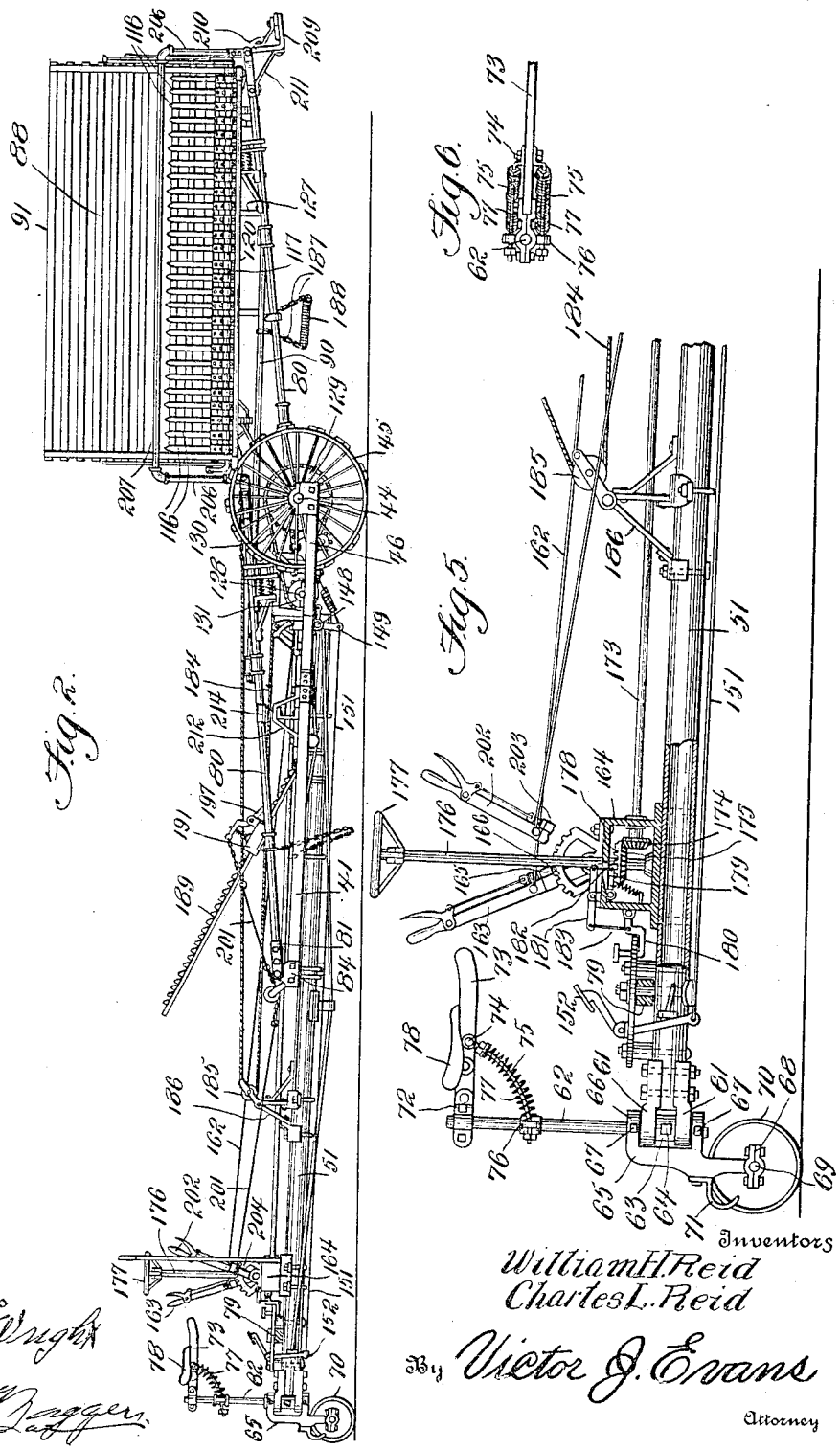

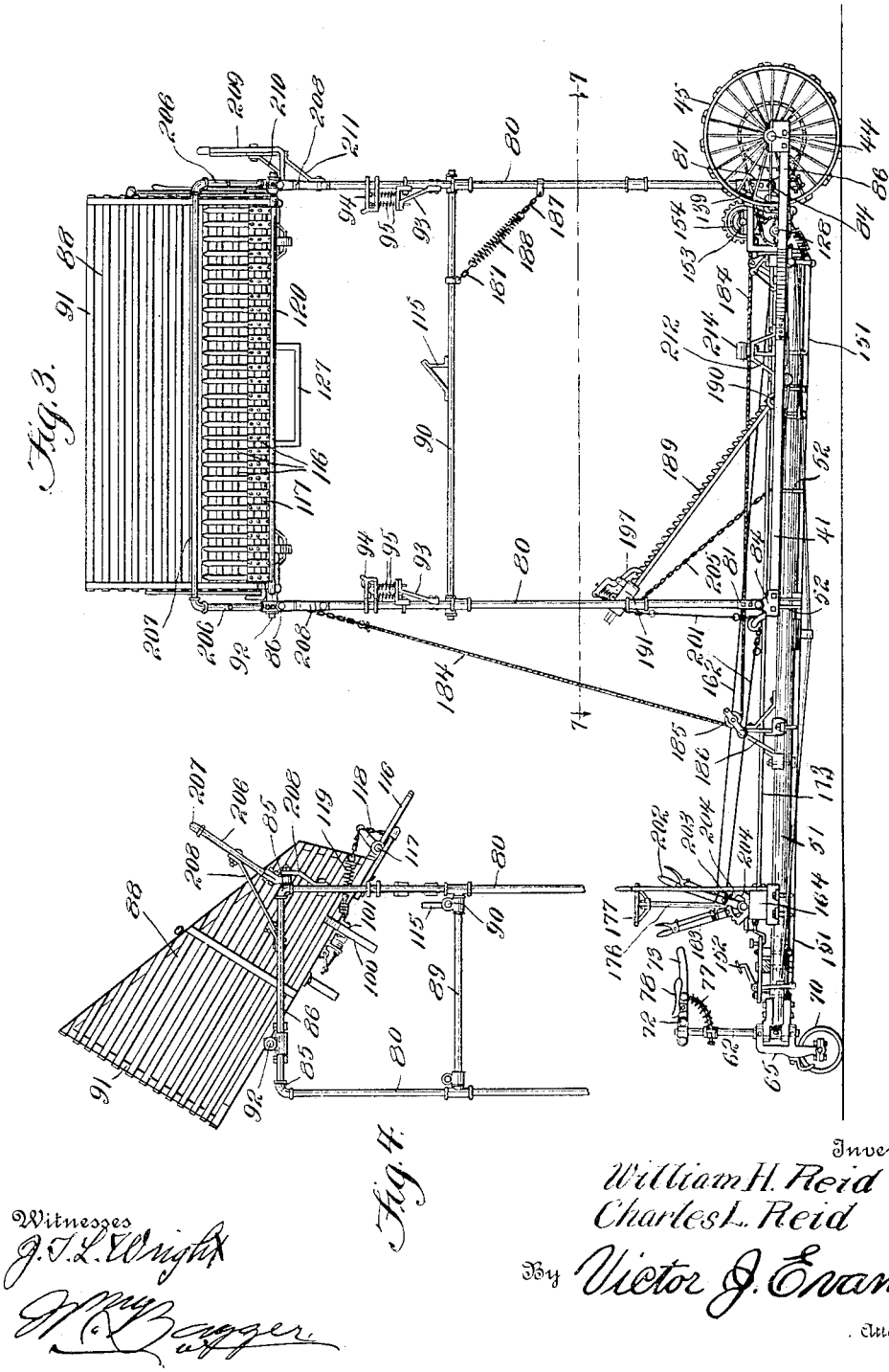

W. H. & C. L. REID.
SELF DUMPING BARGE.
APPLICATION FILED AUG. 26, 1913.
1,117,906.
Patented Nov. 17, 1914.
8 SHEETS—SHEET 4.
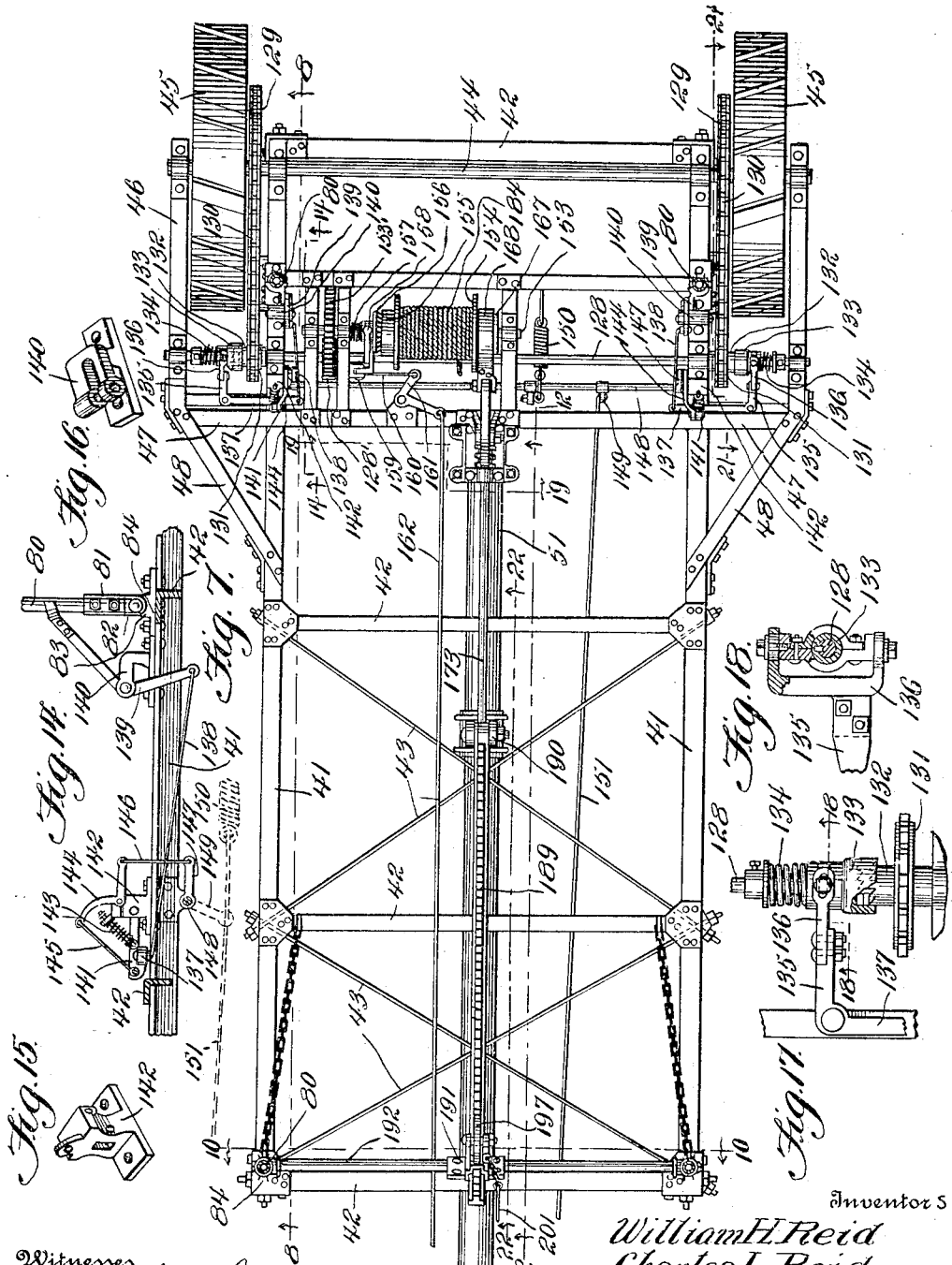
Inventors
William H. Reid
Charles L. Reid
By Victor J. Evans
Attorney
Witnesses

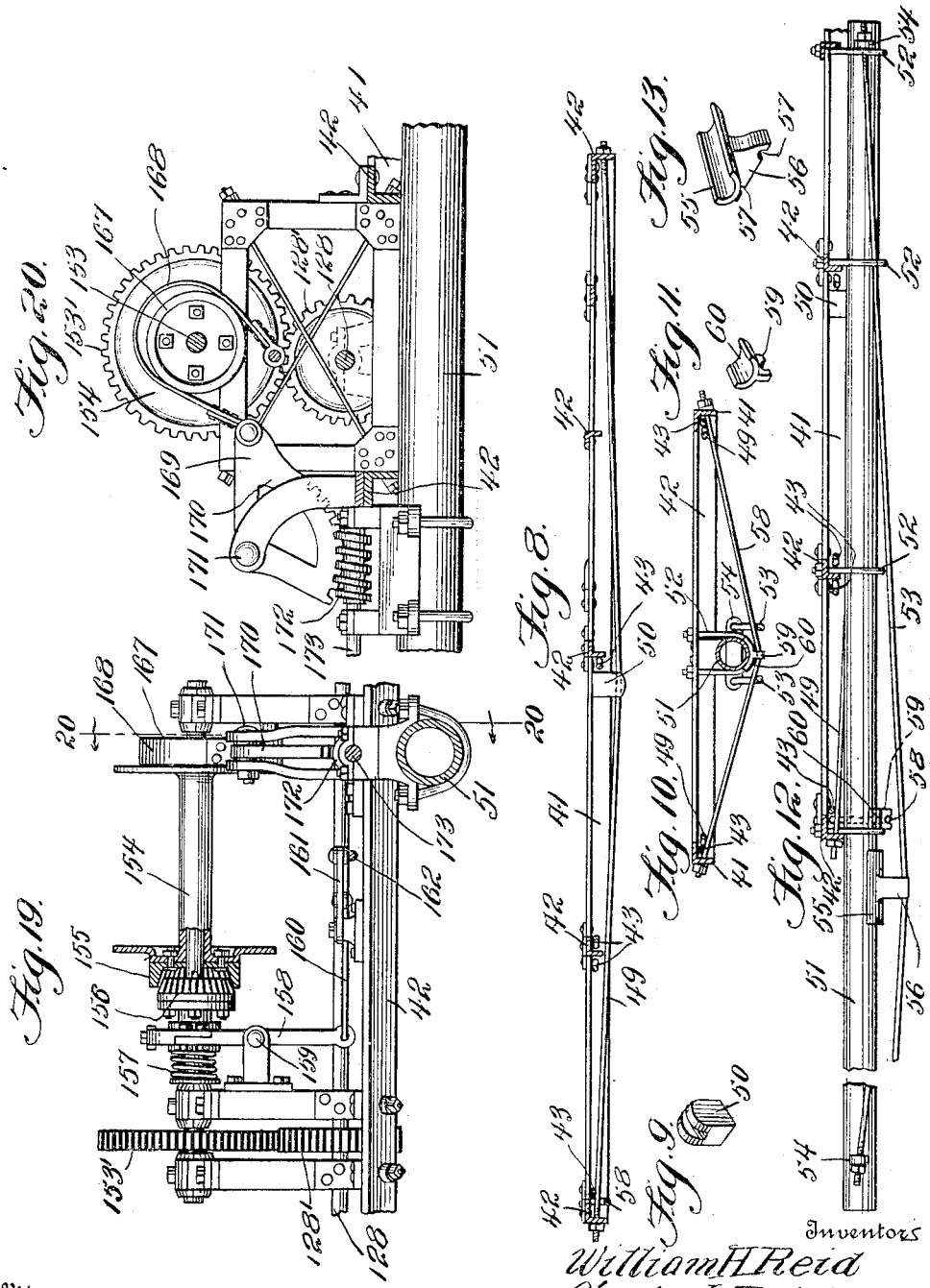

W. H. & C. L. REID.
SELF DUMPING BARGE.
APPLICATION FILED AUG. 26, 1913.
1,117,906.
Patented Nov. 17, 1914.
8 SHEETS—SHEET 6.
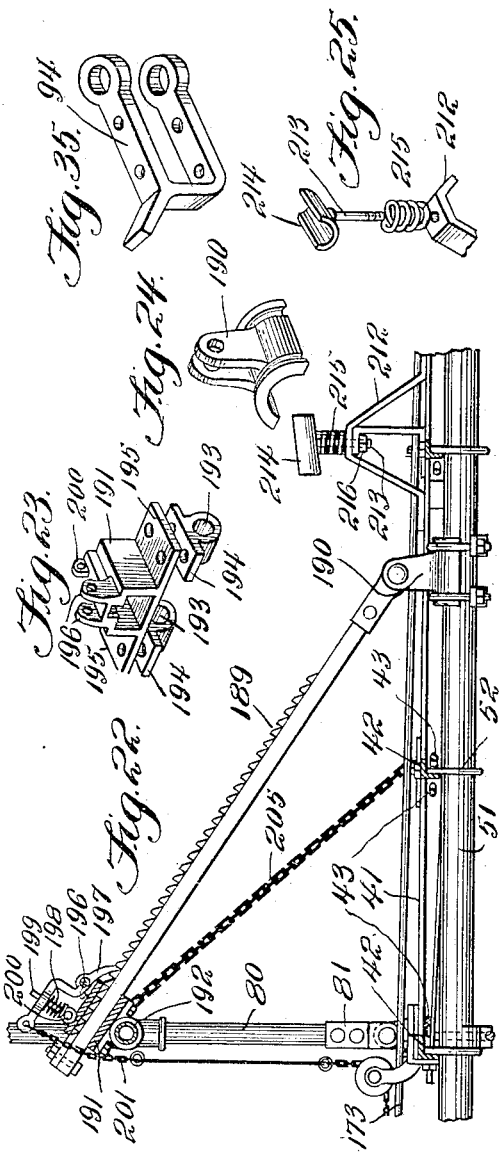
Inventors
William H. Reid
Charles L. Reid
By Victor J. Evans
Attorney
Witnesses

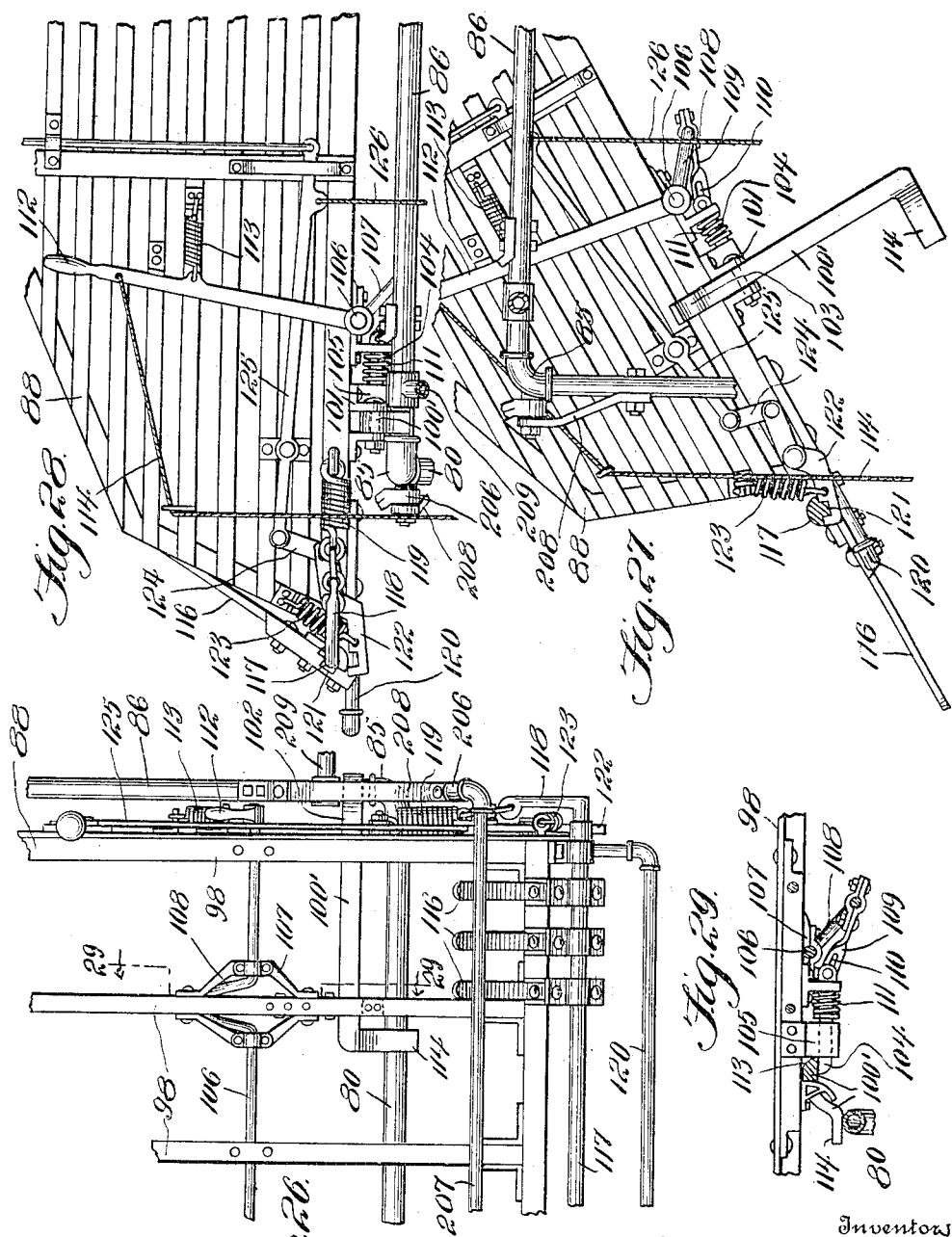

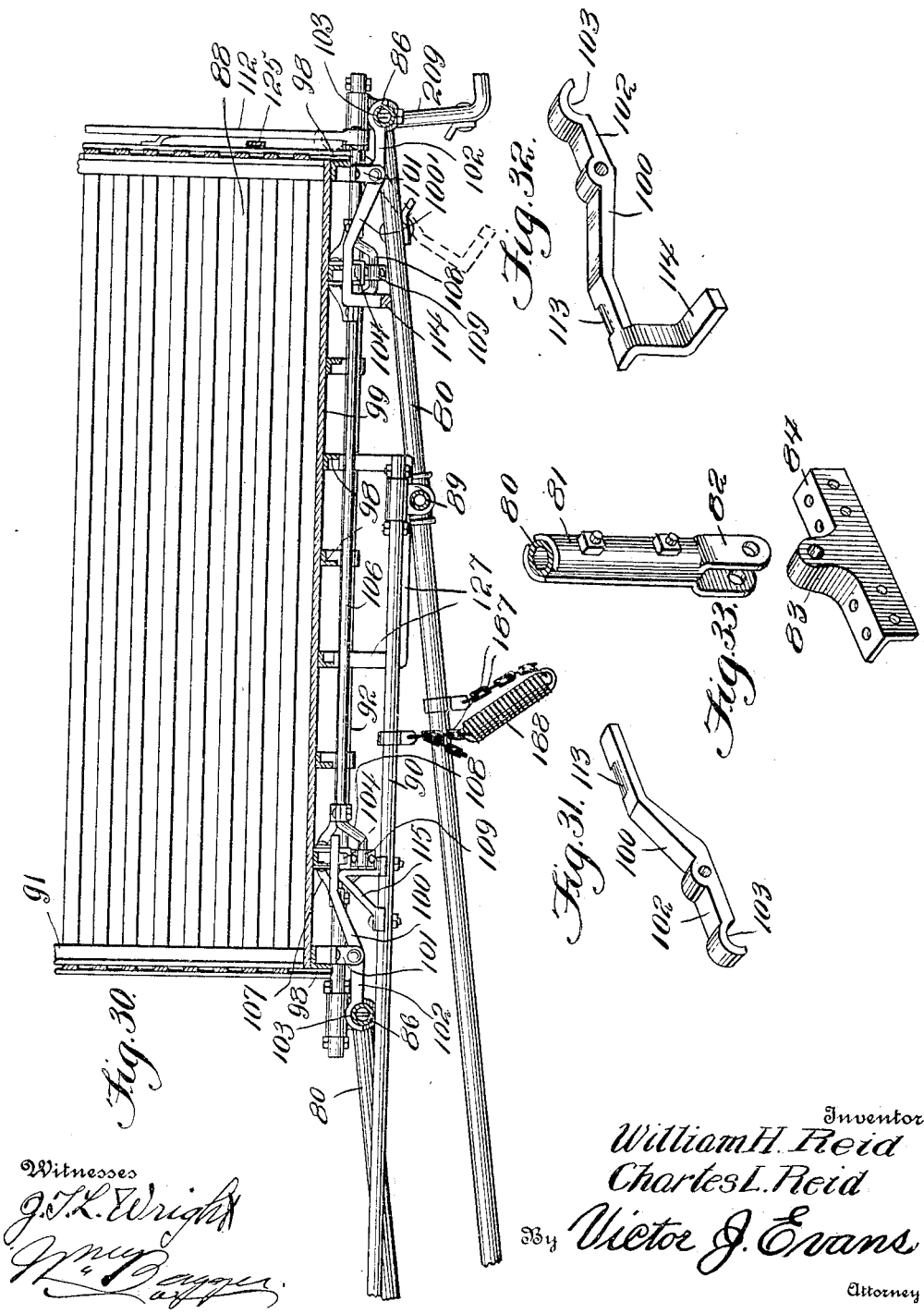

UNITED STATES PATENT OFFICE.

WILLIAM H. REID AND CHARLES L. REID, OF NEKOMA, KANSAS.

SELF-DUMPING BARGE.

1,117,906.  Specification of Letters Patent.  Patented Nov. 17, 1914.

Application filed August 26, 1913.  Serial No. 786,755.

*To all whom it may concern:*

Be it known that we, WILLIAM H. REID and CHARLES L. REID, citizens of the United States, residing at Nekoma, in the county of Rush and State of Kansas, have invented new and useful Improvements in Self-Dumping Barges, of which the following is a specification.

This invention relates to a self dumping barge to be used in connection with grain heading machines for the purpose of receiving the headed grain, conveying the same to the stacking place and placing it on the stack.

One object of the invention is to produce a barge or receptacle of large capacity which will be adapted to travel alongside of the header, said barge being normally supported in a position to receive the heads that are discharged over the lifting conveyer of the header.

A further object of the invention is to provide simple and improved supporting means for the receptacle whereby when filled it may be gradually lifted to a suitable elevation for dumping and discharging the load, the lifting being accomplished while the machine is traveling from the header to the stacking place.

A further object of the invention is to simplify and improve the lifting means and the means for retaining the receptacle in an elevated position.

A further object of the invention is to simplify and improve the construction of the barge receptacle and the manner of supporting and tilting the same for discharging the load.

Further objects of the invention are to simplify and improve the construction, arrangement and assemblage of the detail parts entering into the construction of the machine.

With these and other ends in view which will readily appear as the nature of the invention is better understood, the same consists in the improved construction and novel arrangement and combination of parts which will be hereinafter fully described and particularly pointed out in the claims.

In the accompanying drawings has been illustrated a simple and preferred form of the invention, it being, however, understood that no limitation is necessarily made to the precise structural details therein exhibited, but that changes, alterations and modifications within the scope of the claims may be resorted to when desired.

In the drawings,—Figure 1 is a top plan view showing the machine in receiving position. . Fig. 2 is a side elevation showing the machine in receiving position. Fig. 3 is a side elevation showing the barge elevated previous to dumping or discharging the load. Fig. 4 is an end view showing the barge and a portion of the lifting frame, the barge being shown in dumping or discharging position. Fig. 5 is a side elevation showing the rear end of the push tongue and related parts. Fig. 6 is a top plan view of the seat support, the seat having been removed. Fig. 7 is an enlarged sectional view taken on the line 7—7 in Fig. 3. Fig. 8 is a sectional detail view taken on the line 8—8 in Fig. 7. Fig. 9 is a perspective detail view of one of the frame bar struts. Fig. 10 is a sectional detail view taken on the line 10—10 in Fig. 7. Fig. 11 is a perspective detail view of one of the struts for the end bars of the frame. Fig. 12 is a sectional detail view taken on the line 12—12 in Fig. 7, showing also the rear end of the push tongue. Fig. 13 is a perspective detail view of the push tongue strut. Fig. 14 is a sectional detail view taken on the line 14—14 in Fig. 7. Fig. 15 is a perspective detail view of one of the bearing blocks. Fig. 16 is a perspective detail view of another bearing block. Fig. 17 is a detail view partly in plan and partly in section to show the actuating means for the clutch controlling the counter shaft through which motion is transmitted from the driving axle to the winding drum. Fig. 18 is a sectional detail view taken on the line 18—18 in Fig. 17. Fig. 19 is a sectional view taken on the line 19—19 in Fig. 7. Fig. 20 is a sectional view taken on the line 20—20 in Fig. 19. Fig. 21 is a sectional view taken on the line 21—21 in Fig. 7 through the axle and the counter shaft and showing in elevation one of the ground wheels, the chain transmission between the axle and the counter shaft and the chain tightener. Fig. 22 is a sectional detail view taken on the line 22—22 in Fig. 7 to show the pawl and ratchet means for retaining the barge supporting frame in elevated position. Fig. 23 is a perspective detail view of the ratchet casing or housing. Fig. 24 is a perspective detail view of the bearing that supports the ratchet bar. Fig. 25 is a perspective detail view of one of the sockets for supporting the frame in lowered position. Fig. 26 is a top plan view, enlarged, of a portion of the barge, the bottom of the same having been partly broken away to expose subjacent parts. Fig. 27 is an end view, enlarged, of a portion of the barge, the same being shown in dumping or discharging position. Fig. 28 is an end view, enlarged, of a portion of the barge, showing the same in lowered and receiving position. Fig. 29 is a sectional view taken on the line 29—29 in Fig. 26 to illustrate one of the barge supporting latches. Fig. 30 is a sectional view, enlarged, taken on the line 30—30 in Fig. 1. Figs. 31 and 32 are perspective detail views of the barge supporting latches. Fig. 33 is a perspective detail view showing the means for pivotally connecting one of the barge supporting uprights with the frame of the machine. Fig. 34 is a detail view in elevation of one of the buffers associated with the barge supporting uprights. Fig. 35 is a perspective detail view of a slidable element of one of the buffers.

Corresponding parts in the several figures are denoted by like characters of reference.

The main frame of the improved machine is constructed principally of angle steel, and said frame includes the side bars 41 and a plurality of cross bars 42, whereby said side bars are spaced and connected, diagonal braces 43 being utilized to reinforce the construction. Bearings are provided near the front ends of the side bars 41 for the axle 44 carrying the ground wheels 45, and additional bearings for the axle are supported by auxiliary side bars 46 which are spaced from the forward ends of the side bars 41 by extensions 47 of the foremost cross bars 42, obliquely disposed braces 48 being utilized to connect the rear ends of the auxiliary side bars 46 with the side bars 41. The side bars 41, as best seen in Fig. 8, are reinforced by truss rods 49 and struts 50, one of the latter being shown in Fig. 9.

51 designates a push tongue, the forward end of which is connected with some of the cross bars 42 by means of clips 52, see Fig. 12. The push tongue, which is preferably constructed of metallic tubing is reinforced by tubular truss rods 53 which are terminally connected with lugs 54 on the sides of the tongue and which are intermediately spaced from the tongue by a strut composed of a curved tongue engaging plate 55 having a transversely disposed saddle member 56 provided with truss rod receiving grooves 57, see Fig. 13. Some of the cross bars 42 are reinforced by truss rods 58 which are intermediately spaced from said cross bars by the tubular tongue 51, see Fig. 10, each truss rod being placed in engagement with a notched flange 59 associated with a tongue engaging curved plate 60 which is fitted against the underside of the tongue.

The push tongue 51 is provided at its rear end with bearing members 61 for the steering shaft 62 which is provided with a set collar 63 disposed intermediate the bearing members and provided with a set screw 64 to enable vertical adjustment of the shaft 62 to be effected. The rudder post 65 is provided with arms or brackets 66 engaging the steering shaft and secured thereon by set screws 67. The lower part of the post 65 is bifurcated and provided with bearings 68 for a shaft 69 carrying the rudder wheel 70 which serves to support the rear end of the tongue. A wheel engaging scraper 71 is secured on the post 65. The shaft 62 is provided near its upper end with lugs 72 with which the seat support 73 is pivotally connected, said seat support consisting of an arm having a cross bar 74 which is connected by arcuate rods 75 with a similar cross bar 76 on the shaft 62, the rods 75 being guided through apertures in the cross bar 76, and springs 77 being coiled about the arcuate rods 75 to support the bar or arm 73 in an approximately horizontal position and to yield to the desired extent to the weight of the operator whose seat 78 is mounted on the bar 73. It will be readily seen that the operator when seated may rock the shaft 62 by moving his body to one side or the other, thereby adjusting the rudder wheel and steering the machine. The push tongue supports near its rear end an evener 79 of ordinary construction to which the draft may be applied. It will be understood, however, that within the scope of the invention other means than animal propulsion may be employed.

The frame of the machine supports four posts 80, said posts consisting of metallic tubes on the lower ends of which are bolted clamp plates 81, see Fig. 33, having terminal lugs 82 which are pivotally connected with lugs 83 rising from plates or castings 84 that are bolted or otherwise secured on the side bars of the frame. The four posts are positioned adjacent to the corners of the frame at the four corners of a rectangle. The upper ends of the posts are pivotally connected, at 85, with cross bars 86 supporting a frame 87 on which the barge or receptacle 88 is mounted, see Fig. 30. The front posts, as well as the rear posts, 80 are connected together in pairs intermediate their ends by cross bars 89, see Fig. 4, and said cross bars are connected together by braces 90 which are pivotally connected with said cross bars so as to permit the posts 80 to swing about the axes of the pivots whereby they are connected with the frame from a lowered to an upright or standing position, and vice versa, the posts being preserved in parallel relation by the cross bars and pivoted braces. The barge or receptacle 88 may thus be moved from a lowered receiving position to a raised discharging position, and vice versa, by mechanism provided for the purpose, as will be hereinafter set forth.

The receptacle 88 is provided with the customary high wall 91 at one side thereof to prevent material from scattering when fed into said receptacle by the header conveyer. Said receptacle is supported on a rocking bar or shaft 92 which is journaled on the cross bars 86 in such fashion that its low discharge side may be tilted downwardly between said cross bars and between the posts 80 at one side of the machine, the tilted position being indicated in Fig. 4. Buffers of the construction substantially shown in Fig. 34 are used to support the receptacle in its tilted position, each of said buffers including a bracket member 93 supported on one of the posts 80, a slide member 94 guided for slidable movement on said post, and interposed cushion springs 95 which are coiled about bolts 96 that constitute connecting and guiding members. Each slide member 94 is provided with an obliquely disposed lip 97, whereby angle bars 98 that support the bottom 99 of the receptacle 88 will be guided into engagement with the slides of the buffers.

For the purpose of supporting the receptacle 88 in load receiving position latch members 100 and 100' are provided, shown respectively in Figs. 31, 32. Each of said latch members comprises a lever fulcrumed on a keeper 101 on the receptacle 88 and having an outwardly extending arm 102 which is recessed at 103 to engage one of the cross bars 86 that connect the posts 80. For the purpose of supporting the latch levers 100 in engaging position with respect to the cross bars 86, spring actuated bolts 104 are provided, said bolts being guided in keepers 105 on the underside of the receptacle. A rock shaft 106, see Figs. 26 to 29, inclusive, which is supported for oscillation in bearings 107 on the underside of the receptacle, is provided with cranks 108, said cranks being connected with the bolts 104 by links 109, each having a slot 110 for lost motion. When the bolts 104 are projected by their actuating springs 111, said bolts will support the inwardly extending arms of the levers 100, thus maintaining the outwardly extending arms in engagement with the cross bars 86; by rocking the shaft 106, the bolts 104 may be retracted, thus permitting the latch levers to drop to a non-engaging position indicated in Fig. 27, and thus permitting the receptacle 88 to gravitate to the tilted position shown in said figure. The rock shaft 106 may be oscillated by means of a lever 112 for which a retracting spring 113 may be provided, said lever being conveniently actuated by a suitably guided flexible element or pull cord 114 which may be guided to any convenient point within reach of the operator. The projecting ends of the bolts 104 are rounded or beveled, and the engaging ends of the levers 100, 100' are correspondingly beveled on the sides thereof, as indicated at 113, so that the latch bolts will be readily retracted by contact with the latch levers when the latter are moved to engaging position. The latch lever 100' has been shown as being provided with a laterally extending arm 114 lying in the path of one of the posts 80 so as to be engaged thereby and be moved to bolt engaging position when the receptacle is lowered to the position shown in Fig. 30. For the purpose of similarly actuating the lever 100 one of the brace bars 90 has been shown as being equipped with a contact member 115, but it is obvious that the lever 100 might be provided with an arm similar to the arm 114 for the same purpose, the object being simply to provide a construction whereby the latch levers will be automatically restored to engaging position with respect to the cross bars 86 and the latch bolts 104.

The low side of the receptacle 88 is obstructed by a series of teeth 116 secured upon and extending radially from a rock shaft 17 which is supported for oscillation approximately in the plane of the bottom of the receptacle. The rock shaft is provided at the end thereof with an arm 118 which is connected with one end of a traction spring 119, the other end of which is secured upon an end wall of the receptacle in such fashion that the tension of said spring will be exerted to maintain the rock shaft with the teeth 116 normally in an obstructing position. The receptacle is provided with a bail or bracket 120 to support the teeth 116 when the latter are thrown open against the tension of the spring 119, as will be seen in Fig. 27. The rock shaft 117 has a non-circular portion 121 which, when the teeth are in engagement with the supporting bail 120, is adapted to be engaged by a latch 122 actuated by a spring 123, said latch being in the nature of a lever, one arm of which is connected by a link 124 with one arm of an operating lever 125, the other arm of which is provided with a pull cord 126 which may depend or be suitably guided to a position within convenient reach of the operator. It is obvious that the means for actuating the tooth carrying rock shaft 117, as well as the latch means for the same, may be duplicated at the two ends of the receptacle.

The bottom of the receptacle 88 is provided near the low side thereof with a downwardly depending elongated yoke 127 which, by contact with one of the cross bars 89 will serve to restore the receptacle from a tilted to a non-tilted position, when the receptacle is lowered from its elevated position, as will be hereinafter described. It is when the receptacle is thus restored to a non-tilted position that the outwardly extending arms of the latch levers 100, 100' will be moved into engaging position with respect to the cross bar 86 and the latch bolts 104, as previously described.

For the purpose of actuating the swinging posts whereby the barge or receptacle is supported and moved from a receiving to a discharging position, and vice versa, mechanism is provided including a counter-shaft 128 which is supported for rotation on the frame a short distance in rear of the axle. The counter-shaft receives motion from the ground wheels 45 with which sprocket wheels 129 are associated by means of chains 130 connecting said sprocket wheels with sprockets 131 which are loose on the counter-shaft. Chain tighteners are provided, each including a bell crank 300 fulcrumed on the frame of the machine and one arm of which has a slot 301 for the passage of a securing member, such as a bolt 302, whereby the bell crank may be secured in adjusted position. The other arm of the bell crank has a cross bar 303 on one end of which is pivoted an arm 304 carrying a chain engaging tightening pulley 305. Connected with the arm 304 is an arcuate guide 306 which extends through the heel of the cross bar 303 and about which is coiled a spring 307, the tension of which is exerted to force the wheel 305 into engagement with the chain, the degree of tension being regulated by adjustment of the bell crank by means of the slot 301 and fastening member 302.

The sprocket wheels 131 are connected with the counter-shaft for rotation therewith by means of clutch devices including clutch members 132 formed on the hubs of the sprockets 131 and slidable clutch members 133 which are connected with the counter-shaft for rotation therewith in any well known manner and which are normally forced in engagement with the clutch members 132 by means of springs 134. For the purpose of automatically actuating the clutch members 133 against the tension of the springs 134 shipping levers are provided consisting of bell cranks, each having one arm 135 provided with a fork member 136 engaging the clutch member and each having another arm 137 connected by a link 138 with one arm of a lever 139 fulcrumed on a bearing member 140 secured on the frame, each of said levers having its other arm disposed in the path of one of the posts 80 so that, when engaged by said post as the latter rises to an approximately vertical position, see Fig. 14, the parts will be operated to move the clutch member 133 against the tension of the spring 134 to a non-engaging position with respect to the clutch member 131.

The arm 137 of each shipping lever is adapted to be locked to secure the clutch in non-engaging position by the action of the latch member 141 pivoted on an upright 142, seen in detail in Fig. 15, and actuated by a spring 143. Each upright 142 also supports a bell crank 144, one arm of which is connected by a flexible member or link 145 with the latch 141, the other arm being connected by a link 146 with an arm 147 extending radially from a rock shaft 148. Said rock shaft has a downwardly extending arm or crank 149 connected with a retracting spring 150; said arm 149 is also connected with one end of a flexible element or pull cord 151, the other end of which is connected with a foot lever or pedal 152 supported in convenient proximity to the driver's seat 78.

Supported for rotation in parallel relation to the counter-shaft 128 is a shaft 153 which derives motion from the counter-shaft through intermeshing gears 128', 153. The shaft 153 carries a drum 154 which is loose on said shaft but which may be connected for rotation therewith by a clutch including a member 155 associated with one of the drum heads and a second member 156 which is slidable on and revoluble with the shaft 153, said clutch member 156 being forced in the direction of the clutch member 155 by the action of a spring 157. The clutch member 156 may be actuated against the tension of the spring 157 by a shipping lever 158 fulcrumed at 159, see Fig. 19, and having one arm connected by a link 160 with one arm of a bell crank 161, see Fig. 7, the other arm of said bell crank being connected with one end of a flexible element or pull cord 162, the other end of which is connected with a hand lever 163 mounted on a stand 164 in convenient proximity to the driver's seat and having a stop member 165 adapted to engage a segment rack 166 for the purpose of maintaining the hand lever and the parts actuated thereby in adjusted position.

Associated with the drum 154 is a brake wheel 167 engaged by a flexible brake band 168, one end of which is connected with an arm 169 extending from a segment rack 170 mounted on a rock shaft 171, said segment rack being in mesh with a worm 172 on a shaft 173 that extends rearwardly above the push tongue and the rear end of which has a bevel pinion 174 meshing with a bevel gear 175 on a brake shaft 176 supported in an upright position in the stand 164 and having at its upper end a hand wheel 177, whereby it may be rotated for the purpose of setting or releasing the brake, as may be required. The bevel gear 175 is provided on its upper face with teeth 78 adapted to be engaged by a spring actuated latch member 179, which latter may be released from an engaging position by means including a treadle 180 and a lever 181, one arm of which is connected with the spring actuated latch member by a link 182, while the other arm of said lever is connected by a link 183 with the treadle so that by depressing the latter with his foot, the operator may disengage the spring actuated latch 179 from the teeth 178 upon the bevel gear 175. This will prevent accidental rotation of the shaft 176 by means of the hand wheel 177 and consequent interference with the brake at times when such interference will be objectionable.

Connected with and wound upon the drum 154 is one end of a flexible element 184, the other end of which is connected with one of the cross bars 86 at the top of the posts 80, said flexible element being guided over a pulley 185 which is supported near the rear end of the push tongue by means of a bracket 186. It will be readily seen that when the flexible element 184 is wound on the drum, the receptacle 88 being in the lowered position shown in Fig. 2, the tension thus exerted will tend to lift the posts 80 carrying the receptacle from a reclining to an upright position, the latter being shown in Fig. 3. The pivoted longitudinal brace bar 90 at either side of the machine is connected with one of the front posts 80 by a flexible connection including chains 187 and a coiled spring 188, which latter is placed under tension as the posts supporting the receptacle approach a vertical position. The springs 188 will thus constitute checks or buffers as the receptacle 88 approaches the upward limit of its movement, and the chains 187 will support a spring in an inactive position when the receptacle is lowered, as seen in Fig. 2.

For the purpose of supporting the posts carrying the receptacle in an upright position, as well as in various intermediate positions between the upright and the horizontal, a jack is provided, said jack consisting of a ratchet bar 189 which is pivoted on a lug 190 secured on the push bar 51, as best seen in Fig. 22. Said ratchet bar is guided through the housing 191, see Fig. 23, which is connected with a tubular cross bar 192 connecting the two rear posts 80 by means of sleeves 193 engaging said cross bar and having flanges 194, the housing 191 being provided with corresponding flanges 195 for the passage of fastening members, such as bolts, whereby the parts are assembled. The housing 191 is provided with lugs or ears 196 supporting a pawl 197 that engages the ratchet bar 189, said pawl being actuated by a spring 198 coiled about a pin or bolt 199 which is pivoted on the housing at 200 and which extends through the pawl 197, as shown. The pawl 197 is connected with one end of a suitably guided flexible member 201, the other end of which is connected with a hand lever 202 fulcrumed on the stand 164 engaging a rack segment 204. A strong chain 205 connects the cross bar 192 with the frame of the machine to serve as a stop member to prevent the posts 80 from moving beyond a predetermined upright position. Pivotally connected with the front and rear posts at one side of the machine are arms or brackets 206 connected together by a bar 207, see Figs. 3 and 4, and combining with said bar to constitute a guard for the tiltable receptacle 80. Braces 208 serve to reinforce the arms 206.

A platform 209 is provided with supports 210 hingedly connected with the cross bar 86 that connects the front posts 80, braces 211 being also provided to connect the platform with said front posts.

When the machine is in operation and while the barge is being loaded, an operator is stationed within the receptacle where, with the aid of a pitchfork or other suitable implement, he may scatter the incoming material so that it will be evenly distributed throughout the receptacle. When the receptacle has been filled, he may step on to the platform 209 which will support him while the receptacle is being elevated in a convenient position for tilting the receptacle to a discharging position when the proper elevation has been attained.

For the purpose of supporting the weight of the posts 80 and that of the receptacle 88 when the latter is lowered, brackets 212 are mounted on the frame of the machine, each of said brackets supporting a vertically slidable stem or shank 213 having at its upper end an arcuate holder 214 adapted to receive one of the posts. A cushion spring 215 is placed on the shank 213 to serve as a buffer when a post is lowered into reclining position, when it will be received in the holder 214. The parts are assembled by a nut 216 threaded on the shank 213 and connecting said shank with the bracket 212.

In the operation of this machine it will be seen that it may be pushed over the field alongside of an ordinary grain header by suitable motive power, such as draft animals hitched to the evener 79 at the rear end of the push tongue. The machine may be accurately guided by the driver who occupies the seat 78 and who by simply swaying his body from one side to the other is enabled to exercise full control over the steering wheel. When the receptacle 88 is in its normal receiving position, the posts 80 occupy an approximately horizontal position, the front and rear posts being obviously in parallel relation to each other, so that the receptacle will be supported at all times in an approximately horizontal position. As the machine is driven alongside of the header, the heads coming from the header carrier are discharged into the barge or receptacle 88. When a load has been accumulated, the driver starts the machine away from the header and in the direction of the stacking place, and at the same time he actuates the treadle 152, thereby rocking the shaft 148 against the tension of the spring 150, thus releasing the latches 141 from the shipping lever arms 137 and causing the clutch members 133 to be thrown into engagement with the clutch members 132 by the action of the springs 134, thus causing the countershaft 128 to be rotated by power derived from the ground wheels. The drum clutch comprising the members 155, 156 is next actuated by the hand lever 163, thereby causing the drum to be connected with the shaft 153 for rotation therewith. The flexible element 184 will now be wound upon the drum and, being thus tensioned, it will serve to lift the posts 80 from a reclining to an upright position, thereby lifting or elevating the receptacle 88 carried by the posts. As this operation is being performed, the pawl 197 associated with the housing 191 moves along the ratchet bar 189, which latter will serve to support the posts and related parts in adjusted position whenever the lifting operation is interrupted. It follows that the barge or receptacle may be supported in any intermediate position between its receiving position and the topmost limit to which it may be moved by simply interrupting the operation of the drum, which may be accomplished at any time by means of the hand lever 163. The front posts 80, when they approach a vertical position, will engage the levers 139, thereby actuating the shipping levers 137 to throw the clutch members 133 out of gear against the tension of the springs 134, thereby interrupting the rotation of the counter-shaft 128 and consequently that of the drum which derives motion from said countershaft.

The buffer springs 188 supported by the chains 187 will prevent any violent concussion when the receptacle reaches its topmost limit, and the chains 205 will act as braces and prevent any possibility of the posts swinging rearwardly beyond proper limits. When the stacking place is reached, the operator by pulling the trip rope 114 may release the latch levers 100, 100' from engagement with the bolts 104, thus permitting said latch levers to drop out of engagement with the cross bars 86, and causing the receptacle to tilt by gravitation to the inclined position shown in Fig. 27. When this position is assumed, the contents of the barge or receptacle by the weight exerted on the teeth 116 will swing the latter outward, as shown, until the rock shaft 117 carrying said teeth assumes a position where its non-circular portion 121 will be engaged by the latch 122, thus sustaining the teeth 116 in a non-obstructing position with respect to the receptacle until the entire contents of the latter has been discharged upon the stack. The trip rope 126 may now be actuated to disengage the latch 122 from the non-circular portion of the rock shaft 117, when the latter under the tension of the springs 119 will be restored to its initial position with the teeth 116 obstructing the interior of the receptacle. The operator now sets the brake 168 by manipulating the hand wheel 177, the latch 179 having been thrown out of gear by means of the pedal 180. The hand lever 202 is now actuated to release the pawl 197 from the ratchet bar 189 constituting the jack or support, thus permitting the said ratchet bar to pass unobstructedly through the housing 191 which is mounted pivotally on the cross bar 192 when the posts 80 move from an upright in the direction of a horizontal position, said movement being caused gravitationally by their own weight and that of the receptacle supported thereon. As the receptacle approaches its initial receiving position, the latch levers 100, 100' are restored to locking engagement with the bolts 104, as previously herein described, and the barge or receptacle is likewise restored from its tilted to its initial approximately horizontal position by engagement of the yoke 127 with one of the cross bars 89.

Having thus described the invention, what is claimed as new, is:—

1. In a device of the class described, a transporting frame, pairs of posts pivoted thereon in parallel relation, a receptacle carried by the posts, means including a winding drum and a suitably guided flexible element for lifting the posts from a reclining to an approximately vertical position, and means for sustaining the posts in various positions, said means including a cross bar connecting two of the posts, a housing pivoted on the cross bar and having a spring actuated pawl, and a pivotally supported ratchet bar guided through said housing.

2. In a device of the class described, a transporting frame, pairs of posts pivoted thereon in parallel relation, cross bars connecting the posts at their upper ends, a rocking bar supported on the cross bars, and a receptacle carried by the rocking bar.

3. In a device of the class described, a transporting frame, pairs of posts pivotally connected therewith, a rocking bar carried by the posts in a plane substantially at right angles to the pivotal axes of the posts, and a receptacle supported on the rocking bar and tiltable at an angle to the plane of movement of the posts.

4. In a device of the class described, a transporting frame, pairs of posts pivotally connected therewith, cross bars at the upper ends of the posts, a rocking bar supported on the cross bars, a receptacle carried by the rocking bar, latch levers pivoted on the receptacle and adapted to engage the cross bars, and spring actuated latch bolts carried by the receptacle and adapted to engage the latch levers.

5. In a device of the class described, a transporting frame, pairs of posts pivoted thereon, cross bars connecting the posts, a rocking bar supported on the cross bars, a receptacle carried by the rocking bar, latch levers fulcrumed on the receptacle and having outwardly extending arms adapted to engage the cross bars, spring actuated latch bolts associated with the receptacle and adapted to engage the latch levers to support them in engaging position with respect to the cross bars, and means for simultaneously actuating the latch bolts to release the levers.

6. In a device of the class described, a transporting frame, pairs of posts pivoted thereon, a tiltable receptacle carried by the posts, means for sustaining the receptacle in non-tilted position including latch levers fulcrumed on the receptacle and spring actuated bolts carried by the receptacle and adapted to engage the levers, and means associated with the posts to engage the latch levers and to move said levers to bolt engaging position.

7. In a device of the class described, a transporting frame, pairs of posts pivoted thereon, a tiltable receptacle carried by the posts and having a longitudinal yoke on its underside, and a cross bar associated with the posts and lying in the path of the yoke to restore the receptacle from tilted to non-tilted position by contact with said yoke when the receptacle is moved to receiving position.

8. In a device of the class described, a transporting frame, pairs of posts pivoted thereon, cross bars at the upper ends of the posts, a rocking bar carried by the cross bars, a tiltable receptacle on the rocking bar, latch levers fulcrumed on the receptacle and adapted to engage the cross bars, spring actuated latch bolts associated with the receptacle and adapted to engage the latch levers, an engaging member consisting of a yoke carried by the receptacle, and means associated with the posts to contact with the engaging member and to engage the latch levers when the receptacle moves to receiving position to restore said receptacle from tilted to non-tilted position and the latch levers to bolt engaging position.

9. In a device of the class described, a transporting frame, pairs of posts pivoted thereon, a tiltable receptacle carried by the posts, cross bars connecting the posts intermediate the ends thereof, and a longitudinal brace bar pivotally connected with the cross bars.

10. In a device of the class described, a transporting frame, pairs of posts pivoted thereon, a tiltable receptacle carried by the posts, cross bars connecting the posts intermediate the ends thereof, a longitudinal brace bar pivotally connected with the cross bars, and a flexible buffer member including a spring connecting a post with the longitudinal brace member.

11. In a device of the class described, a transporting frame, pairs of posts pivoted thereon, a tiltable receptacle carried by the posts, cross bars connecting the posts intermediate the ends thereof, a longitudinal brace bar pivotally connected with the cross bars, means for swinging the posts to elevate the receptacle, and resilient means connecting a post with the pivoted longitudinal brace bar to check swinging movement of the posts beyond a predetermined point.

12. In a device of the class described, a transporting frame, pairs of posts pivoted thereon, a tiltable receptacle carried by the posts, means for sustaining the receptacle in non-tilted position, and buffers carried by the posts to receive the impact of the receptacle when tilted.

13. In a device of the class described, a transporting frame, pairs of posts pivoted thereon, a tiltable receptacle carried by the posts, means for sustaining the receptacle in non-tilted position, brackets secured on some of the posts, slides mounted on the posts above the brackets, springs interposed between the slides and the brackets, and guide means for the slides, the later being positioned in the path of the receptacle when the latter is tilted to receive the impact thereof.

14. In a device of the class described, a transporting frame, pairs of posts pivoted thereon, a tiltable receptacle supported by the posts, means for lifting the posts from a reclining to an upright position, and means for supporting the receptacle in non-tilted position, said receptacle being provided with resiliently supported obstructing means capable of being moved to non-obstructing position by the weight of the contents.

15. In a device of the class described, a transporting frame, a tiltable receptacle, means for supporting said receptacle and for lifting it from a receiving to a discharging position, means for supporting the receptacle in non-tilted position, and means for releasing the last named supporting means to permit the receptacle to tilt gravitationally to discharge the contents thereof; said receptacle being provided with resiliently supported obstructing means capable of being moved when the receptacle is tilted to non-obstructing position by the weight of the contents.

16. In a device of the class described, a transporting frame, pairs of posts pivoted thereon, cross bars connecting the posts in pairs, a tiltable receptacle carried by the posts, means including cushion springs for supporting the posts in lowered position, and means for lifting the posts to an approximately vertical position, said means including a winding drum and a flexible element guided from said drum to a cross bar connecting some of the posts.

17. In a device of the class described, a transporting frame having ground wheels, a tiltable receptacle, swinging posts pivoted on the frame and supporting the receptacle, means for actuating the swinging posts including a shaft, a drum on said shaft and a hoisting element connecting the drum with the posts, and means for transmitting motion from the ground wheels to the drum carrying shaft including a counter-shaft, a clutch device on said counter-shaft, a clutch device on the drum carrying shaft, and means for independently actuating the two clutch devices.

18. In a device of the class described, a transporting frame having ground wheels, a tiltable receptacle, swinging posts pivoted on the frame and carrying the receptacle, means for actuating the swinging posts including a shaft, a drum thereon and a hoisting element connecting the drum with the posts, and means for transmitting motion from the ground wheels to the drum including two separate clutch devices, and means for independently actuating the same.

19. In a device of the class described, a transporting frame having ground wheels, a tiltable receptacle, swinging posts pivoted on the frame and supporting the receptacle, means for actuating the swinging posts including a shaft, a drum on said shaft, and a hoisting element connecting the drum with the posts, means for transmitting motion from the ground wheels to the drum including a counter-shaft, a clutch device on said counter-shaft, and a second clutch device on the drum carrying shaft, means for independently actuating the two clutch devices, a friction brake associated with the drum, and means for setting the brake.

20. In a device of the class described, a transporting frame having ground wheels, a tiltable receptacle, swinging posts pivoted on the frame and carrying the receptacle, means for actuating the swinging posts including a shaft, a drum on said shaft, and a flexible element guided from the drum to the posts, means for transmitting motion from the ground wheels to the drum including a counter-shaft, a spring actuated clutch device thereon, and a clutch device on the drum carrying shaft, a shipping lever for the last mentioned clutch device, means including a hand lever for actuating the shipping lever, a shipping lever for operating the spring actuated clutch device on the counter-shaft against the tension of the actuating spring, spring actuated latch means engaging the said shipping lever to maintain the clutch in unshipped condition, and means including a pedal for actuating the latch means.

In testimony whereof we affix our signatures in presence of two witnesses.

WILLIAM H. REID.
CHARLES L. REID.

Witnesses:
A. J. KNEFFER,
GEO. A. RYAN.

Copies of this patent may be obtained for five cents each, by addressing the "Commissioner of Patents, Washington, D. C."